April 12, 1960 F. W. JAVERY 2,932,195
DRILLING JIG

Filed July 3, 1958 2 Sheets-Sheet 1

INVENTOR
FRANCIS W. JAVERY

BY William E O'Brien
ATTORNEY

April 12, 1960 F. W. JAVERY 2,932,195
DRILLING JIG
Filed July 3, 1958 2 Sheets-Sheet 2
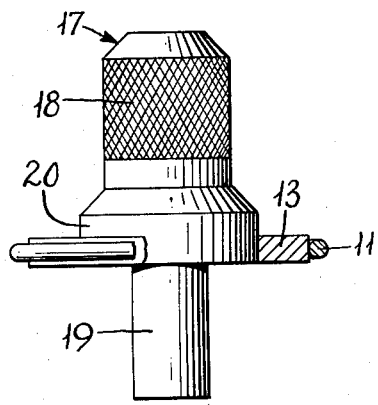
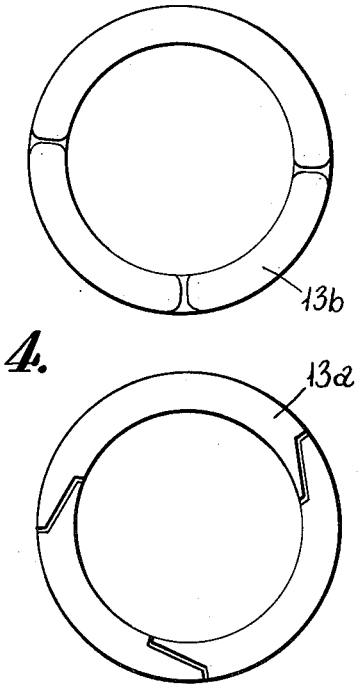
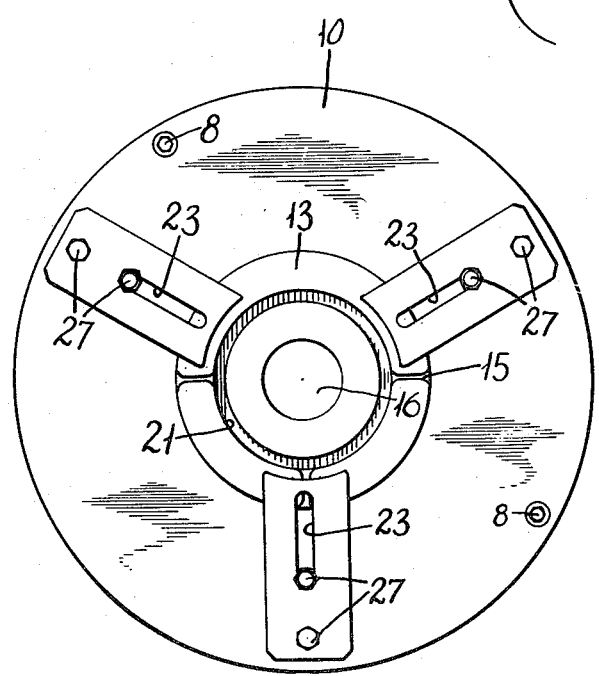
INVENTOR
FRANCIS W. JAVERY
BY
ATTORNEY

United States Patent Office 2,932,195
Patented Apr. 12, 1960

2,932,195

DRILLING JIG

Francis W. Javery, Tivoli, Tex., assignor to Union Carbide Corporation, a corporation of New York Application July 3, 1958, Serial No. 746,388

5 Claims. (Cl. 77—63)

This invention relates to drilling or reaming jigs, and more particularly to a jig device for reconditioning split metallic packing rings, a principal object of the invention being the provision of a jig plate in combination with a removable centering plug of improved construction and arrangement whereby split rings of worn packing are effectively and accurately secured in axial alignment with a cutting tool of a lathe or other similar device.

Segmented or split rings of metallic construction are well known materials which find wide application as packing for piston rods in a variety of compressors, oil and gas engines, reciprocating machinery, and the like. As used with piston rods in heavy duty compressors, for example, six to ten segmented rings are assembled about a piston rod in a packing gland together with a packing-gland follower and gland nut. The split segments are held in place by an encircling spring and form a thin doughnut-like arrangement which help maintain a pressure-tight seal, the bore of the rings being within about 0.001 inch of the piston rod diameter. A seal between the packing rings and piston rod is maintained by the injection of lubricating oil into the packing gland housing and the reciprocating motion of the piston rod thus seals the small opening.

Scoring of packing rings frequently occurs through the action of chemicals and/or solid particles which contaminate the injected lubricating oil. Additionally, after normal wear, the bore of the rings becomes about 0.005 inch larger than the diameter of the piston rod and the tension of the clamping spring about the packing ring cannot compensate for the wear and effectively narrow the bore. The frequency for replacement of packing rings varies depending upon their service application in a particular apparatus. Even though it is recognized that the rings might be re-bored, the worn packing was heretofore sold as scrap metal because of their difficulty in being positioned in a lathe due to the segmented construction. As a practical matter it was less expensive in time and labor to employ new rings.

The present invention is designed to provide a jig plate for effectively holding and centering split metallic packing rings with respect to the axis of a cutting tool. A further object of the invention is to provide a jig plate wherein split segmented rings of any size may be accurately bored to varying predetermined depths by making simple adjustments with respect to the centering device. Another object is to provide a drill jig of simple construction which can be easily manufactured at minimum cost.

The above objects together with additional objects of the invention are accomplished by the combination and arrangement of parts more fully described in the following specification and accompanying drawings in which:

Fig. 3 is an elevational view of the centering plug;

Fig. 4 is a plan view of a radial and tangential packing ring; and

Fig. 5 is a plan view of a jig plate according to another embodiment of the invention.

Figure 1:
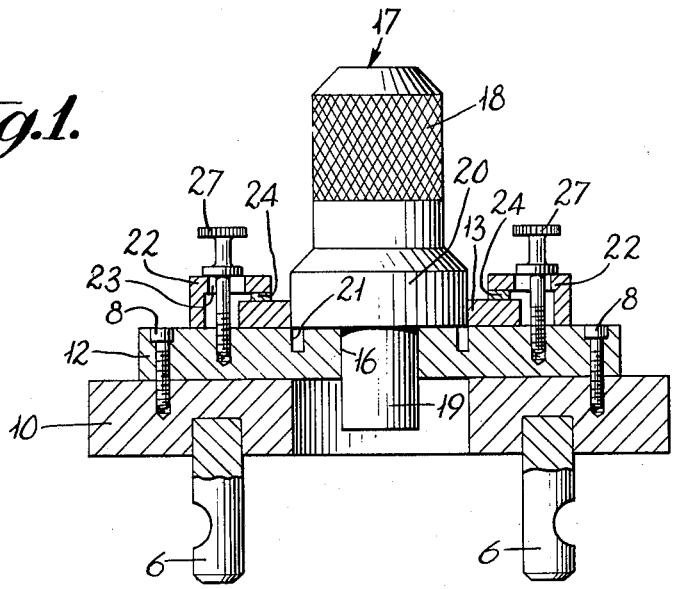
Fig. 1 is a side elevational view showing a conventional face plate of a lathe with the novel jig plate and centering plug mounted thereon.

Referring now to Fig. 1 of the drawings, the present invention is illustrated as embodying a face plate 10, a jig plate 12 having a packing ring 13 mounted thereon, and a centering plug 17. The face plate 10 is of standard type construction, having one or more screw threaded openings therein, and is removably securable to the bottom side of jig plate 12 in a conventional manner by suitable attaching means, as with socket screws 8, for example, so that the face plate can be removed from the jig plate and another face plate of different size substituted therefor. Conventional stock pins 6 serve as means for detachably connecting the face plate to a lathe spindle for rotation therewith. The face plate 10 and jig plate 12 preferably are of circular shape and may be of the same thickness.

Figure 2:
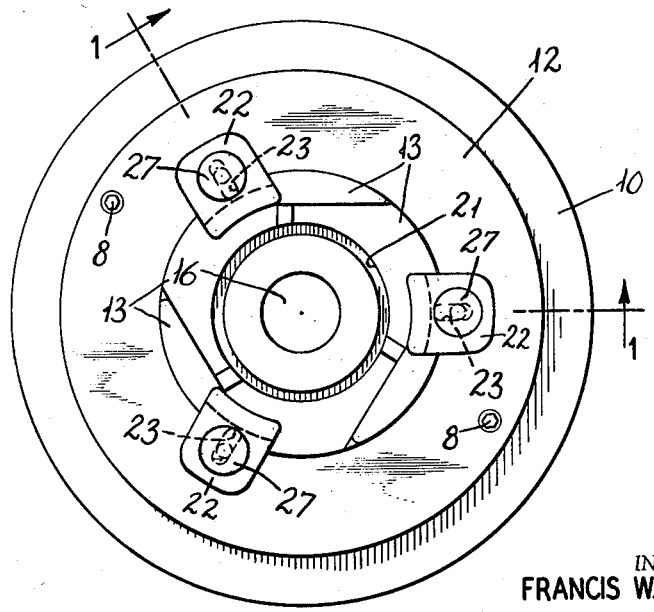
Fig. 2 is a plan view of the jig plate with the centering plug removed therefrom.

As shown in Fig. 2, the circular jig plate 12 is provided with a centrally located annular opening 16 which extends vertically through the jig plate for reception of centering plug 17. Adjacent the opening 16 is a circular tool groove 21 which extends downward from the top of the jig plate approximately one-half the height of the plate. When a packing ring 13 is operatively positioned on jig plate 12, the circular groove permits a cutting tool of a lathe or other similar device sufficient room to clear the edge of the ring and thereby remove any burr which would otherwise be present on the ring if a groove were not employed.

Radially mounted on the face of the jig plate 12 are a plurality of slidable segment clamps 22, three being shown, the ends of which are spaced from the opening 16 and which serve to hold the packing ring 13 in place. Each clamp 22 is provided with an elongated radial slot 23 located along the center line thereof which is normal to the centering plug 17 when operatively positioned in opening 16. One clamp is preferably used for securing each split segment of packing ring 13 to the jig plate. As shown in Fig. 1 the end portion of the clamp advantageously contains a rectilinear copper member 24 disposed in perpendicular relation to the clamp which serves to prevent the ring segments from being damaged when the clamps are tightened by means of set screws 27.

The centering plug 17 as illustrated in Fig. 3 is preferably of hardened steel construction and is designed for mounting and truing the packing ring 13 about the opening 16. In the embodiment shown, the centering plug consists of an upper handle section 18, a lower cylindrical pilot member 19 which fits snugly within the opening 16 in the jig plate, and a circular boss or shoulder member 20 disposed intermediate the handle and pilot members which rests on the upper surface of the jig plate about opening 16. The boss member 20 is designed for engagement with the packing ring 13 which is circumferentially assembled and retained about the boss member by clamping means 22. The encircling spring member 11 is used for keeping the segmented sections together during their assembly about the boss member and is removed after the packing ring is properly assembled and clamped into position.

The split packing rings 13 shown in Figure 4 are of the conventional type commonly employed as metallic packing for piston rods in a variety of reciprocating machinery, as above described. The packing rings are made of bronze, lead-bronze alloy or any other suitable material, and usually consist of three segmented sections which may be of the tangential type 13a or radial type 13b.

In operation, the centering plug 17 is positioned in opening 16 of jig plate 12 and packing ring 13, by means of spring member 11, is assembled snugly around the boss member 20, the diameter of the boss member being approximately 0.005 inch smaller than the diameter of the piston rod to which the reconditioned packing ring is fitted. Clamps 22 are slidably moved over each segment 13 and are tightened firmly by means of screws 27 for securely clamping the segments to the jig plate 12. Centering plug 17 and spring member 11 are then removed and the ring is thus effectively held and positioned concentric to opening 16. The face plate 10 is then mounted on a lathe in axial alignment with a cutting tool which removes a 0.005-inch cut from the inside periphery of the packing ring. If the packing ring is deeply scored and a 0.005-inch cut does not provide sufficient smoothness for reuse, a boss member having a diameter of 0.015 inch smaller than the piston rod is employed. The operation is exactly the same except that a cut of 0.015 inch is taken from the bore of the packing ring.

In the modification shown in Fig. 5, the packing ring 13 is positioned in a recessed groove 15 disposed concentric to the centrally located opening 16. When operatively positioned in groove 15, the top surface of the packing ring is level with the top surface of the jig plate. The clamping means and adjusting screws employed are substantially the same as shown in Fig. 2 except for the omission of the rectilinear copper facing 24.

From the above description it is readily seen that the combination jig plate and centering plug described herein provides a mechanism of simple construction which effectively holds and centers split packing rings with respect to the axis of a lathe cutting tool or other device. The cost of the jig plate assembly is nominal and operation thereof is rapid with a minimum of effort on the part of the operator. The apparatus is versatile in that different diameters of packing rings can be handled by merely changing the size of the centering plug.

What is claimed is:

1. A drill jig for holding and centering split metallic packing rings comprising, in combination, a jig plate provided with a centrally located opening therein extending vertically through said plate, a removable centering plug having a pilot member adapted to fit within said opening, said pilot member having a boss member disposed above said jig plate for mounting and truing a split packing ring about said opening, and clamping means attached to said jig plate whereby said packing ring is effectively held and positioned concentric to said opening when said centering plug is removed therefrom.

2. The apparatus of claim 1 wherein the diameter of said boss member is from about 0.005 to 0.015 inch smaller than the diameter of a piston rod to which said packing rings are to be fitted.

3. The apparatus of claim 2 wherein the clamping means attached to said jig plate comprise a plurality of radially mounted, slidable clamps.

4. A drill jig for holding and centering segmented tangential and radial packing rings comprising, in combination, a circular jig plate provided with a centrally located annular opening therein extending vertically through said plate, a removable centering plug having a pilot member adapted to fit within said opening, said pilot member having a circular boss member disposed above said jig plate for mounting and truing said ring about said opening, said boss member having a diameter of about 0.005 inch smaller than the diameter of a piston rod to which said ring is to be fitted, and clamping means attached to said jig plate whereby said ring is effectively held and positioned concentric to said opening when the centering plug is removed therefrom.

5. The apparatus of claim 4 wherein said clamping means comprise a plurality of radially mounted slidable clamps in conjunction with an encircling spring member circumferentially retained about said ring.

References Cited in the file of this patent

UNITED STATES PATENTS

| 2,498,696 | Middaugh | Feb. 28, 1950 |
| 2,834,233 | Anderson | May 13, 1958 |